તે2,714,076
Patented July 26, 1955

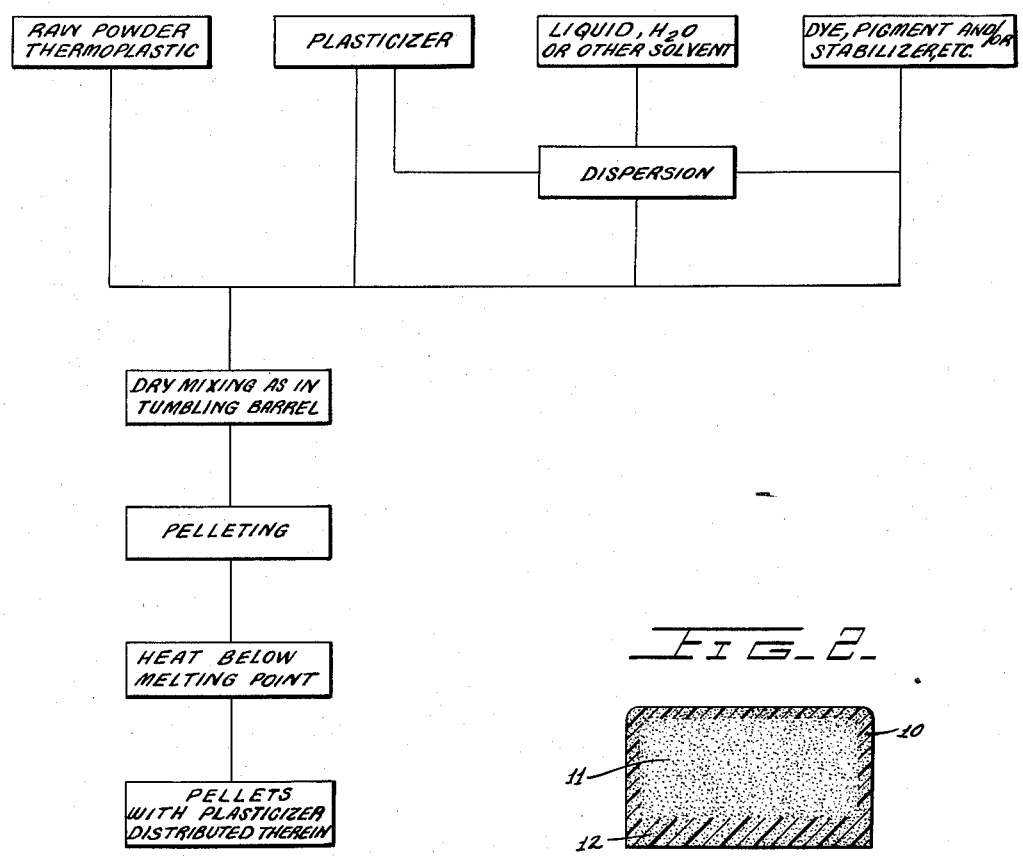
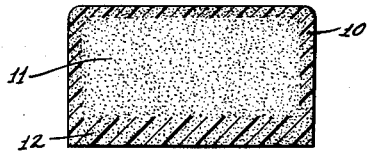

2,714,076

PLASTICIZED PELLET OF THERMOPLASTIC MATERIAL AND PROCESS OF MAKING SAME

Peter H. Seckel, New York, N. Y., assignor to Richard A. Fisch

Application February 28, 1951, Serial No. 213,153

8 Claims. (Cl. 117—100)

This invention relates to a process of making a plasticized pellet of thermoplastic material and the pellet so produced.

An object of the invention is to provide a method of plasticizing a powdered thermoplastic material and forming it into pellets without the necessity of masticating, melting, extruding calendering or otherwise changing the physical state of the thermoplastic material prior to pelleting.

Another object of the invention is to provide a thermoplastic pellet which contains a better dispersion of plasticizer, dye, stabilizer and other compounding materials therein.

Another object of the invention is to provide plasticized pellets of thermoplastic material which pellets do not crumble, chip or form a powdery residue when subjected to the normal frictional forces present in conveyors, chutes or other devices for feeding the pellets to the final molding device.

In the usual process of plasticizing the thermoplastic powder and plasticizer are first mixed dry and then the mix is drastically treated on some mechanical apparatus such as Banbury, a roll mill, an extruder, etc., under heat and/or pressure, during which treatment the physical state of the powder is changed i. e., the powder particles lose their identity, and a compact mass is obtained. The compact mass must then be broken up and pelleted, when pellets of uniform size are desired. The mechanical treatment under heat and/or pressure is so drastic that unplasticized particles are united before the plasticizer is completely incorporated and it is then very difficult to plasticize the large conglomerates of unplasticized particles. Pellets or particles of such mixes must be allowed longer mixing periods in the subsequent molding processes.

Another object of the invention therefore is to provide a pellet which is plasticized and which contains no unplasticized conglomerate of the thermoplastic material.

These objects and others ancillary thereto are obtained by:

1. dry mixing a thermoplastic powder and a plasticizer or a dispersion thereof at ordinary room temperature so that no compacting of the particles takes place and so that particles coated with the plasticizer are obtained.

2. pressure molding the dry powder to the size of pellets desired and:

3. thereafter heat treating the separated pellets at a temperature approaching the melting point of the unplasticized particles whereby the particles swell and absorb the plasticizer. When heated in an ordinary oven the outside surface vitrifies to produce a hard shell when cooled. The depth of the shell may be varied by increasing the heating conditions, the time and temperature for example. With induction heating the entire pellet may be vitrified. This hardened surface will not chip off and serves to encase the pellet. In some cases where a very sticky solid plasticizer is employed such as tricresyl phosphate, the heating step can be omitted but the heating always produces a harder pellet.

Dyes, stabilizers, pigments, scents etc. can be added to the plasticizer dispersion and be incorporated into the pellets in this way.

Since the process is primarily a physical one and depends only on the thermoplastic properties of a given material it is apparent that it may be employed with any material which is thermoplastic at temperatures below 400° for example. It is obvious that a plasticizer should be selected which is effective with the thermoplastic material that is to be plasticized. The organic derivatives of cellulose are especially susceptible to being made into pellets of this invention. Also polymers of compounds having the general formula

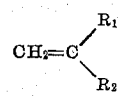

in which $R_1$ is a negative radical of the group consisting of aryl, vinyl, ethynyl carboxyl, halogino, CO—O alkyl, alkoxy and nitrilo and $R_2$ is a radical of the group consisting of hydrogen and methyl, are well suited to being plasticized by the process of the present invention. The plasticizer can be added in amounts of from 5–50% of the thermoplastic material depending on the results desired in the product which is to be formed from the pellet.

In the drawing:

Figure 1 is a flow sheet setting forth the various essential steps of the process.

Figure 2 is a cross sectional view of a typical pellet after the heat treating step.

As indicated at the right hand side of the flow sheet of Figure 1 the plasticizer is mixed with water or other solvent to form a liquid dispersion or solution. Other materials to be incorporated such as pigments, dyes and stabilizers can also be dispersed in the solvent. Enough solvent is employed to wet the surfaces of all the particles. Some plasticizers which are liquids at room temperature can be added as such without dispersing in water. The two components, i. e., the dispersion and the thermoplastic particles, are thoroughly mixed in a tumbling barrel, for example, under normal or ambient conditions of heat and pressure so that no agglomerations of the particles takes place, the product of the mixing consisting of the unplasticized powder containing a surface coating of plasticizer, etc.

The coated particles are then formed into pellets of the desired size in any kind of pelleting machine. Thereafter the separated pellets are heated so as to cause the plasticizer to diffuse and penetrate into the thermoplastic. Due to the heat and/or the plasticizer the pellets may swell somewhat. In ordinary heating devices such as ovens the outside surface are heated to the highest temperature and upon subsequent cooling, a hardened layer is formed over the entire outside layer as shown at 10 in Figure 2 whereas the inside 11 remains somewhat porous and of lower density. The surface layer 12 of the bottom is relatively thick. The swollen pellets have the plasticizer substantially uniformly distributed throughout the mass thereof.

The process can be employed for any type of thermoplastic powder the size of the individual particles of which is less than the size of the pellets to be made.

Since prior to the heating step, every pair of adjacent particles in the pellet are separated by a layer of plasticizer, no pair of adjacent particles can aggregate without absorbing the plasticizer therebetween and therefore no large unplasticized particles are ever present in the pellets.

The following examples illustrate how the process is carried out.

Example 1

70 lbs. of cellulose acetate flake containing 56–58% of combined acetic acid, and of particle size 20 mesh, is mixed with 30 pounds of diethyl phthalate containing stabiliser and colorants in the following way. This diethyl phthalate mixture is made up by dispersing:

1/10 oz. tartaric acid
1/5 lb. titanium dioxide pigment, and
1/5 lb. yellow lead chromate pigment
in a small amount of diethyl phthalate, by means of a ball mill or a point mill.

This mixture is then diluted with diethyl phthalate to make up a total of 30 lbs.

The cellulose acetate flake and the diethyl phthalate mixture are then carefully blended by tumbling the mixture in a drum. The resulting mixture is a fairly free-flowing powder.

This powder is then pelletized by means of any standard tabletting machine and pellets of any size, though preferably 1/4 diameter and 1/4" high, may be formed.

These pellets may be hard enough for most applications, but they may be further hardened by heating the pellets to 350° F. for 3–4 minutes. This is accomplished by passing the pellets on a conveyor belt through a heated tunnel or by storing the pellets on trays in an oven.

The resulting product is a hard, fused pellet.

By substituting part of the diethyl phthalate plasticizer with tricresyl phosphate which is a solid plasticizer (diethyl phthalate is a liquid) a harder pellet may also be produced.

Example 2

60 lbs. of polyvinyl chloride polymer, of 150 mesh size are mixed with 40 lbs. of dioctyl phthalate containing stabiliser and colorants.

The mixture is made up as in Example 1, except that basic lead carbonate is used instead of tartaric acid.

The procedure for making the pellets is the same.

It will be seen that the invention provides not only a novel method of making the pellet but also provides a pellet which is case hardened or hardened throughout so that it does not chip or spall.

I claim:

1. In a process of forming pellets consisting primarily of a thermoplastic material for use in subsequent molding processes which pellets are substantially uniformly impregnated with a plasticizer for the thermoplastic material and which pellets are substantially free from chipping and spalling, the steps comprising dry mixing finely divided thermoplastic material with a liquid plasticizer-containing composition at a temperature below the melting point of the thermoplastic material, the amount of liquid being such as to be completely absorbed by said thermoplastic material so as to coat the individual particles with a layer of said plasticizer, forming the coated particles into compacted pellets at a temperature below the melting point of said thermoplastic material and only thereafter heating said pellets to a temperature around the melting point of the unplasticized thermoplastic material whereby the plasticizer diffuses throughout the pellet and the surface region of the pellet vitrifies and forms a hard shell when the pellet is cooled.

2. The process of claim 1 in which coloring compounds are added to the liquid with which the particles of thermoplastic material are coated.

3. The process of claim 1 in which stabilizing compounds for the thermoplastic material are added to the plasticizer containing liquid with which the thermoplastic particles are coated.

4. The process of claim 1 in which the thermoplastic material is an organic derivative of cellulose.

5. The process of claim 1 in which the thermoplastic material is a polymer of a compound having the general formula:

$$CH_2=C\begin{matrix}R_1\\ \\R_2\end{matrix}$$

in which $R_1$ is a negative radical of the group consisting of aryl, vinyl, ethynyl, carboxyl, halogino, CO—O alkyl, alkoxy and nitrilo, and $R_2$ is a radical of the group consisting of hydrogen and methyl.

6. A non-chipping and non-spalling plasticized pellet for use in molding devices consisting primarily of thermoplastic material, the said pellet containing a plasticizer for the thermoplastic compound substantially uniformly distributed throughout the same, the outside surface of said pellet being vitrified and hardened so as to encase the pellet and prevent the spalling and chipping thereof.

7. A non-chipping and non-spalling plasticized pellet consisting primarily of a thermoplastic organic derivative of cellulose, the said pellet containing a plasticizer for the organic derivative of cellulose substantially uniformly distributed throughout the same, the outside surface of said pellet being vitrified and hardened so as to encase the pellet and prevent the spalling and chipping thereof, the inside portion of said pellet being nonvitrified whereby a plurality of said pellets are readily conglomerated and formed into a uniform mass under heat and pressure.

8. In a process of forming pellets consisting primarily of a thermoplastic material for use in subsequent molding processes, which pellets are substantially uniformly impregnated with a plasticizer for the thermoplastic material and which pellets are substantially free from chipping and spalling, the steps comprising dry mixing finely divided thermoplastic material with a liquid plasticizer at a temperature below the melting point of the thermoplastic material so as to coat the individual particles with a layer of said plasticizer, forming the coated particles into compact pellets at a temperature below the melting point of said thermoplastic material and only thereafter heating said pellets to a temperature around the melting point of the unplasticized thermoplastic material whereby the plasticizer diffuses throughout the pellet and the surface regions of the pellet vitrifies and forms a hard shell when the pellet is cooled.

References Cited in the file of this patent

UNITED STATES PATENTS

| Number | Name | Date |
|---|---|---|
| 1,976,363 | Northrop | Oct. 9, 1934 |
| 2,328,065 | Dreyfus | Aug. 31, 1943 |
| 2,372,761 | Boyd | Apr. 3, 1945 |
| 2,477,009 | Sandler | July 26, 1949 |
| 2,489,373 | Gilman | Nov. 29, 1949 |

FOREIGN PATENTS

| Number | Country | Date |
|---|---|---|
| 476,638 | Great Britain | Dec. 10, 1937 |
| 500,298 | Great Britain | Feb. 7, 1939 |